Sept. 1, 1959 C. L. McNEIL ET AL 2,902,115

CHECKOUT STAND

Filed Nov. 4, 1957 4 Sheets-Sheet 1

INVENTOR.
CLYDE L. McNEIL
EDWIN N. BUCK JR.
BY
ATTORNEY.

INVENTORS.
CLYDE L. McNEIL.
EDWIN N. BUCK JR.
BY [signature]
ATTORNEY.

Sept. 1, 1959

C. L. McNEIL ET AL 2,902,115

CHECKOUT STAND

Filed Nov. 4, 1957

4 Sheets-Sheet 3

INVENTOR.
CLYDE L. McNEIL
EDWIN N. BUCK JR.
BY
Otto A. Earl
ATTORNEY.

INVENTOR.
CLYDE L. McNEIL
EDWIN N. BUCK JR.
BY
[signature]
ATTORNEY 2,902,115
Patented Sept. 1, 1959

2,902,115

CHECKOUT STAND

Clyde L. McNeil and Edwin N. Buck, Grand Rapids, Mich., assignors to Spee-Dee Check Out Systems, Grand Rapids, Mich.

Application November 4, 1957, Serial No. 694,398
19 Claims. (Cl. 186—1)

This invention relates to improvements in checkstands. The principal objects of this invention are:

First, to provide a checkstand of the rotatable turntable type with a control system for the turntable that will keep the turntable operating to deliver articles of a purchase to the checker but which will stop the turntable if articles are delivered too fast for the checker to handle and also at the end of a customer's order.

Second, to provide a novel form of order divider for separating successive orders on the turntable, which divider will automatically stop the turntable at the end of a customer's order.

Third, to provide a novel order divider and register support for a turntable checkstand which permits the divider to be easliy picked up by the checker and transferred to a receiving slot along the left side of the cash register for automatic advancement under the register support to a ready position for further use by succeeding customers.

Fourth, to provide a turntable type checkstand having a yieldable catch that holds order dividers in convenient exposed position on the turntable near the customer unloading area so that the divider is easily released by the customer for rotation with the turntable when desired.

Fifth, to provide an order divider system for a turntable typecheckstand in which the dividers are hooked over the periphery of the turntable by a concealed hook and carried around with the turntable until the hook actuates a limit switch to stop the turntable with the end of the order adjacent to the checking position on the checkstand.

Other objects and advantages of the invention will be apparent from a consideration of the following description and claims. The drawings, of which there are four sheets, illustrates a highly practical form of the checkstand control and order divider system and one modified form of divider release mechanism.

This invention relates to improvements in the type of checkstand for self-service stores more particularly disclosed and claimed in the patent to Will L. George, No. 2,599,909, issued June 10, 1952. The present invention provides means for automatically controlling the operation of the turntable and for separating the orders or purchases of succeeding customers.

Figure 7:
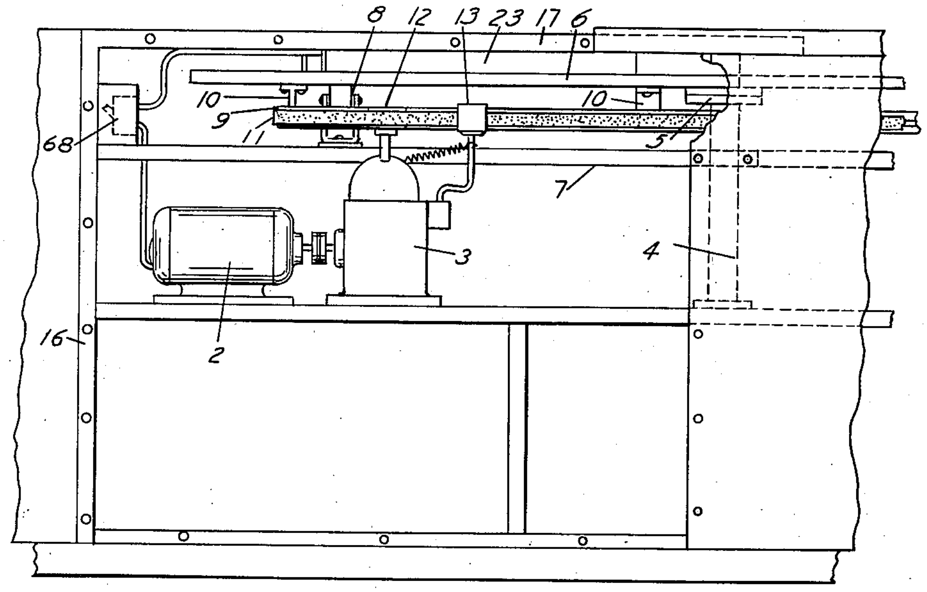
Fig. 7 is a fragmentary right side elevational view of the checkstand with a side panel removed to expose the driving mechanism.

The checkstand includes a suitable cabinet-like base a portion of which appears at 1 in Fig. 7. The details of the base can vary so long as they support the motor 2, reduction gear box 3, and turntable shaft 4. The shaft 4 has a thrust collar 5 that rotatably supports the circular turntable 6. Cross pieces 7 of the cabinet support caster rollers 8 that support the periphery of the turntable. A large pulley wheel 9 is suspended from the bottom of the turntable by brackets 10 and a belt 11 connects the pulley wheel with a drive pulley 12 on the reduction gear. 13 is a belt-tightening pulley.

Figure 1:
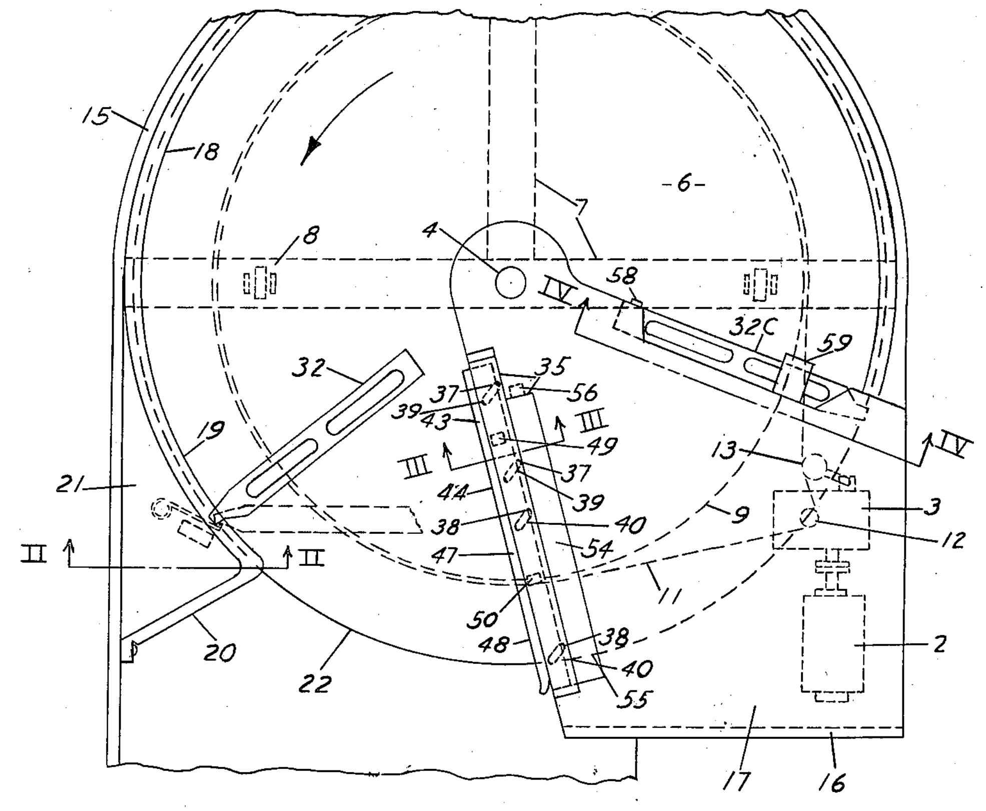
Fig. 1 is a fragmentary top plan view of a check-stand embodying the table control and order divider systems of the invention.

The cabinet includes a discharge counter 14 that extends rearwardly from the left rear sector of the turntable as viewed in Fig. 1 and a rim 15 extending around the front of the turntable to the right side of the checkstand. An intermediate rearwardly facing vertical wall 16 and the right wall of the stand support a cash register support panel 17 over the right rear sector of the turntable. The register support panel may be supported at its front left corner on the projecting end of the turntable shaft 4.

Figure 2:
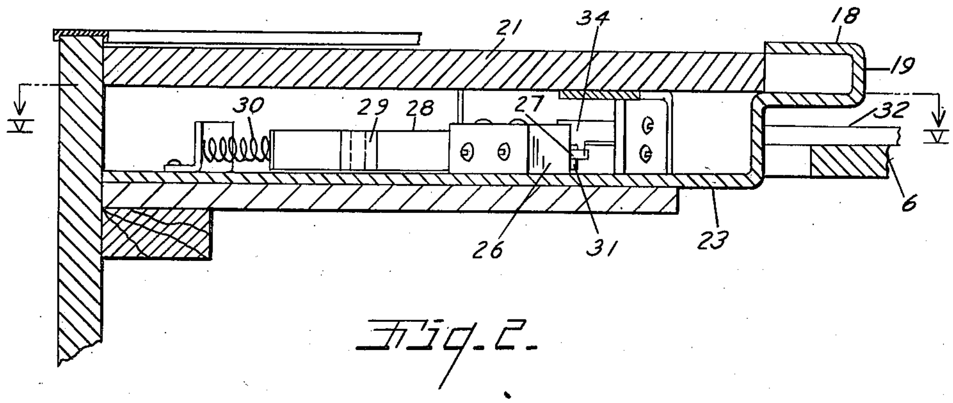
Fig. 2 is an enlarged fragmentary vertical cross-sectional view taken along the plane of the line 2—2 in Fig. 1 and looking in the direction of the arrows.
Figure 5:
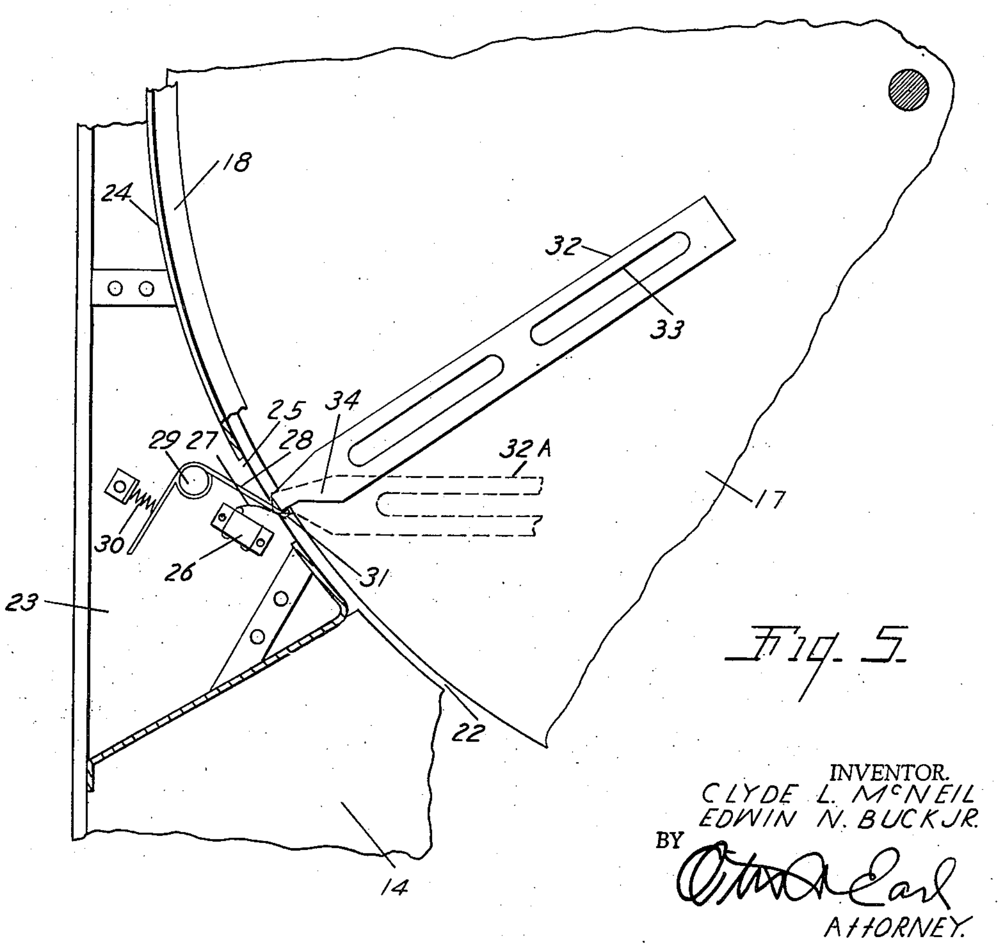
Fig. 5 is an enlarged fragmentary plan view of the limit switch assembly with the cover removed as viewed generally along the plane of the line 5—5 in Fig. 2.

With particular reference to Figs. 1, 2 and 5 it will be noted that a guard ring 18 of outwardly opening channel section is secured to the inside of the rim 15 in upwardly spaced overhanging relation to the periphery of the turntable. The ring has an inwardly extending portion 19 that curves inwardly toward the register support panel a short distance from the left edge of the checkstand. An anchor arm 20 on the guard ring is angled sharply outwardly to the rim 15. A cover plate 21 of generally triangular shape covers the area bounded by the inwardly projecting portion 19 and the arm 20. Between the cover plate 21 and the register support panel 17, the front end of the discharge counter 14 is closely spaced and conformed to the shape of the turntable as at 22 so that articles can easily be slid from the turntable to the discharge counter.

Within the triangular space under the cover plate 21 is a switch housing 23 having an arcuate side wall 24 with an opening 25 therein in spaced relation to the periphery of the turntable. A minimum movement switch 26 having an operating tappel 27 is mounted in the housing opposite the opening and in the path of movement of a limit arm 28. The arm 28 is pivoted at 29 and spring biased toward the turntable by the spring 30. The limit arm has an inwardly projecting hook 31 on its swinging end for a purpose which will appear presently.

The checkstand is provided with one or more divider bars 32 that are flat elongated bars with grooves 33 in their upper surfaces. The bars have downturned hooks 34 adapted to overhang the periphery of the turntable and depend along the edge of the turntable. The divider bar lies on the surface of the turntable 6 in generally radially extending position and moves around with the turntable as it rotates until the hook 34 engages the hooked end 31 on the limit arm. The engagement of the hooks 31 and 34 of course stops movement of the radially outer end of the divider bar and as the turntable continues to rotate the inner end of the divider bar is advanced swinging the divider bar to the position indicated by the dotted lines at 32A in Fig. 5. The downturned hook 34 twists in the hook 31 and forces the limit arm 28 away from the turntable and into the opening 25 to actuate the switch 26. The switch 26 is wired as will be described to deenergize the motor and stop the turntable.

Figure 3:
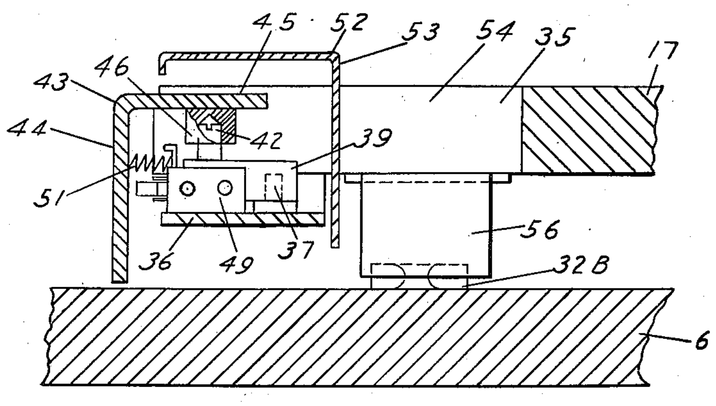
Fig. 3 is a fragmentary vertical cross-sectional view taken along the plane of the line 3—3 in Fig. 1 and looking in the direction of the arrows.

With particular reference to Figs. 1 and 3 it will be noted that the left edge of the register support panel is inclined slightly ahead of a true radius of the turntable. The turntable rotates in a counterclockwise direction underneath the register support panel and articles placed on the turntable tend to be cammed rearwardly along the left edge of the register support panel. The left edge of the support panel is notched or recessed as at 35 and a switch assembly bridges the open side of the recess in general alignment with the edge of the support panel.

The switch assembly consists of a switch plate 36 secured at its ends to the underside of the register support panel in closely spaced relation above the turntable. The switch plate carries a forward pair of pivot pins 37 and a rearward pair of pivot pins 38. The pins 37 and 38 swingably support a forward pair of arms 39 and a rearward pair of arms 40. Each arm has on its swinging end an upstanding pivot pin 42 that can be screwed into the arm to adjust the height of the pin. The pins on the forward arms 39 swingably support a forward switch actuator 43 having an upright bumper surface 44 (see Fig. 3) on its left and a top flange 45 with depending bearing bosses 46 fitting over the pins 42. The pins on the rearward arms 40 support a similar rear switch actuator 47 having a bumper surface 48 on its left edge. A forward switch 49 is secured to the switch plate to be actuated by the movement of the forward actuator to the right. A rear switch 50 on the switch plate is arranged to be actuated by movement of the rear actuator to the right. Springs 51 bias the switch actuators to the left and the force of the articles of a customer's purchase advanced by the turntable against the bumper surfaces 44 and 48 open the switches. The switches 49 and 50 are wired to the motor as will be described.

A cover 52 fits over the switch assembly and has a depending flange 53 that defines with the inner edge of the recess 35 an elongated slot 54 that extends rearwardly across the periphery of the turntable as appears most clearly at 55 in Fig. 1. A stop 56 is secured to the underside of the register support panel at the forward end of the slot 54. The length of the slot 54 is such that the operator or checker can pick up and disengage the divider bar from the limit switch arm 28 and thrust the inner or forward end of the divider bar into the slot 54 and against the stop 56 and simply let the divider bar drop onto the turntable as indicated by the dotted lines at 32B in Fig. 3. The stop 56 will cause the hooked end 34 of the divider bar to fall over the periphery of the turntable and as the turntable rotates it will carry the divider bar underneath the register support panel.

Figure 4:
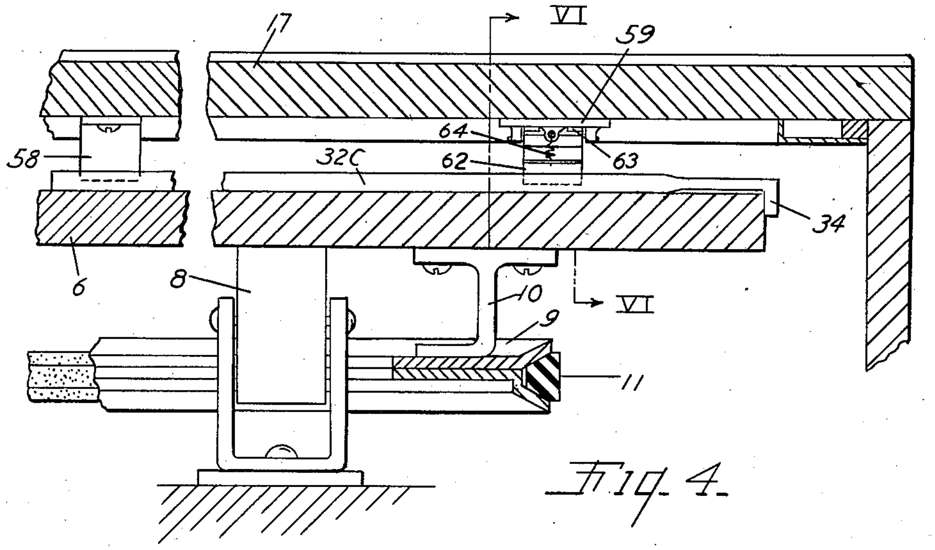
Fig. 4 is a fragmentary vertical cross-sectional view taken along the plane of the line 4—4 in Fig. 1 and looking in the direction of the arrows.

In order to hold or retain one or more divider bars in ready position for convenient use by successive customers, the front edge of the register support panel is rearwardly notched or recessed as at 57 (see Fig. 1). A fixed depending catch 58 is secured to the support panel to engage and stop the radially inner end of the leading divider bar as at 32C in Fig. 4. A bracket 59 secured to the support panel carried a radially outer movable catch 60 that stops the outer end of the divider bar. As appears most clearly in Figs. 4 and 6 the catch 60 is an angled member pivoted to the bracket at 61 and having a depending front flange 62 and a rearwardly projecting flange 63. A spring 64 biases the flange 62 downwardly with sufficient force to resist forward movement of the divider bar as the turntable 6 rotates. The top surface of the divider bar and the groove 33 therein is exposed in the notch or recess 57 so the customer has only to pull the leading divider bar forwardly under the yielding catch flange 62 and the divider bar will be free to rotate with the turntable over the exposed customer unloading area of the checkstand. (Note that freeing the radially outer end of the divider bar will permit it to swing forward sufficiently to clear the fixed inner catch 58.) The customer does not have to disengage the outer hooked end 34 of the divider bar from the periphery of the turntable and the hooked end travels around the front of the turntable under the guard ring 18. The rear flange 63 swings down to intercept a second divider bar and prevent the release of two dividers.

Figures 6, 8:
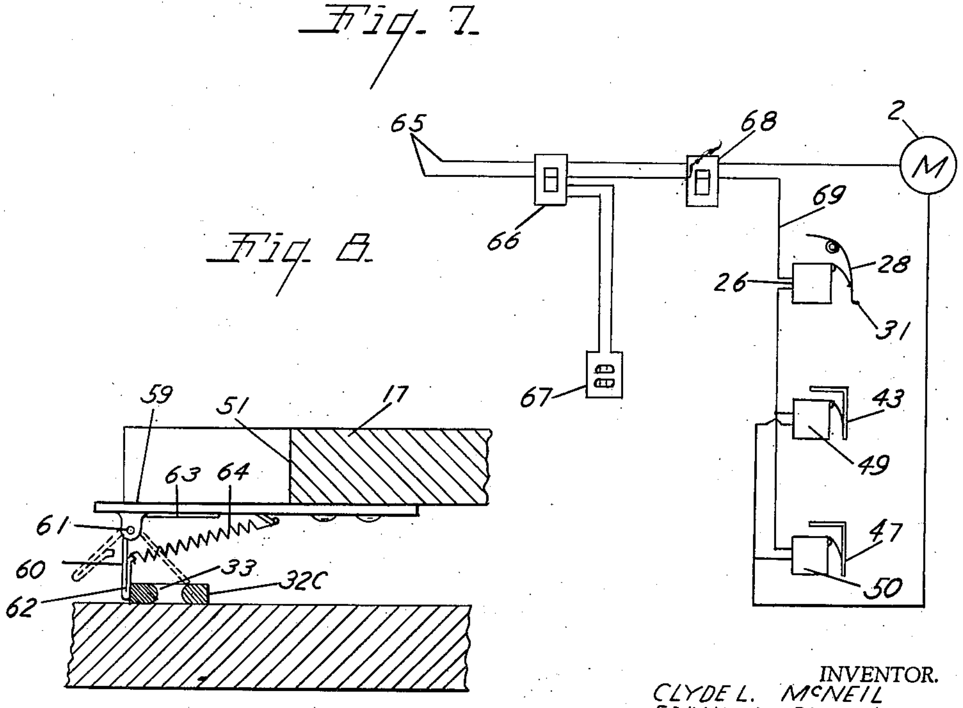
Fig. 6 is a fragmentary vertical cross-sectional view taken along the plane of the line 6—6 in Fig. 4.
Fig. 8 is a schematic wiring diagram showing the electrical connections of the checkstand.

The motor 2 is desirably provided with an induction braking system (not illustrated) so that the turntable 6 stops immediately upon deenergization of the motor. The motor and the checkstand are wired as shown in Fig. 8. The power source is indicated at 65 and is controlled by a first toggle switch 66. Closing the switch 66 energized a convenience outlet 67 that permits an electrically operated cash register on the stand to operate as well as any lamps or electric signs that may be attached. The switch 66 also energized a toggle switch 68 through which the motor 2 is energized. A conductor 69 from the switch 68 is connected in series through the limit switch 26 and then in parallel to the switches 49 and 50. The switches 49 and 50 are connected in parallel to the motor and from there back to the manual toggle switch 68.

The operation of the stand is as follows: With no articles on the turntable and with the switches 66 and 68 closed, the turntable will rotate. The divider bars 32 may be assumed to be sliding on the turntable behind the catches 58 and 60. A customer approaches the checkstand from the front and starts to place the articles of her purchase on the rotating turntable which carries the articles around to the left side of the cash register support panel and a cash register that is normally placed thereon. A single article placed near the periphery of the turntable will strike the rear switch actuator 47 and open the switch 50 but the table will continue to be energized through the switch 49. Similarly, an article placed toward the center of the turntable will strike the switch actuator 43 and open the switch 49 but if the switch 50 is closed the table will continue to rotate and the article will be cammed rearwardly along the bumper surface 44 to the bumper surface 48 so as to successively close switch 49 and open switch 50. The operator or checker may of course check either of these single items and move them manually to the discharge counter at any time.

When a number of articles are advanced at the same time (i.e. faster than the checker can handle them) both switch actuators 43 and 47 will be engaged and both switches 49 and 50 will be opened to stop the motor and the turntable. As the checker's efforts clear the checking area beside the rear switch actuator, the motor will start intermittently to continuously keep a supply of articles in a position to be checked.

If, after placing all the article of her purchase on the turntable, the customer released the leading divider bar 32 it would follow around behind the last article of the purchase until its hook 34 engaged the hook 31 on the limit arm 28 and arrested true radial motion of the divider bar. The inner end of the divider bar will rotate rearwardly behind the last article of the purchase until the switch 26 is opened as described. The turntable then stops and the checker can complete checking the final articles and collect for the total purchase while the turntable is stationary.

The checker restarts the stand by lifting the hook 34 at the outer end of the divider bar clear of the turntable (there is sufficient clearance under the guard ring 18 to do this) and manually lifts the divider bar and places it in the slot 54 as previously described. The turntable automatically starts upon closing of the switch 26 when the divider bar was removed and a succeeding order is advanced to the checker.

Figure 9:
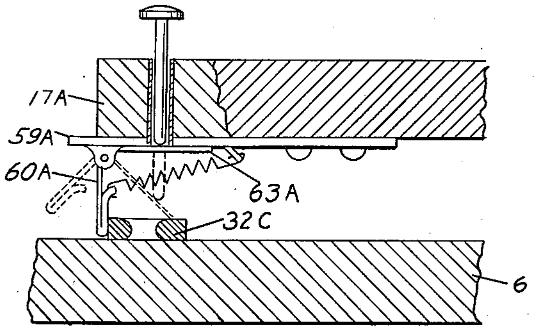
Fig. 9 is a fragmentary vertical cross-sectional view similar to Fig. 6 but showing a modified form of divider bar catch and release.

A modified form of structure for retaining and selectively releasing the divider bars at the front edge of the register support panel is illustrated in Fig. 9. Instead of recessing the front edge to expose the leading divider bar, the bracket 59A is secured under the support panel to support the angled release catch 60A in much the same manner as the catch 60. A plunger 70 projects downwardly through the panel 17A and engages the rear flange 63A so that the catch may be actuated to release a divider bar by simply pressing down on the plunger 70.

It will be understood that with each form of the divider bar release, the cash register of the stand is placed on the register support panel 17 between the checker and the divider bar release. The forward edge of the register support panel is desirably angled rearwardly to expose as much of the turntable as possible but this may vary depending on the relative sizes of the cash register and the turntable to be used.

Having thus described the invention, what is claimed as new and desired to secure by Letters Patent is:

1. In combination with a checkstand having a rotatable receiving table, a fixed cash register support panel supported over a sector of said turntable and extending beyond the periphery thereof, said panel being supported along its rear and right edges and at a point over the center of the turntable, said panel having a left edge inclined ahead of a radius of the turntable in the direction of travel of the turntable under the panel, said left edge having an elongated recess therein, the front edge of said panel extending radially with respect to said turntable and at an angle of less than 90° with respect to said left edge and having an elongated recess therein, a stand supporting said turntable and extending in radially spaced relation around the front of the turntable, a guard ring secured to said stand and vertically overlying the periphery of the turntable from said front edge of said panel to the left side of the turntable and curving inwardly a limited distance part way toward said left edge of said panel, a fixed discharge counter extending as a continuation of said turntable and closely conformed to the periphery thereof between said left edge and said inwardly curved portion of said guard ring, a switch plate supported across the end of the recess in the left edge of said panel by being secured at its ends to the underside of the panel, two pairs of arms swingable about vertical axes on said switch plate and having upstanding vertically adjustable pivots on their swinging ends, front and rear switch actuators having upright bumper faces and top flanges each swingably supported by a pair of said pivots on the swinging ends of said arms, springs on said switch plate biasing said actuators to the left of said panel, a pair of switches mounted on said switch plate one behind each of said actuators, said switches being normally closed and opened by movement of said actuators to the right, a cover over said switches and actuators, the inner edge of the recess in the left edge of said panel and the right edge of said cover defining a slot extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a fixed catch depending below the front edge of said panel to intercept the radially inner end of said divider bar, a swingable catch mounted on the front edge of said panel to intercept the radially outer part of said divider bar with the bar exposed under the recess in the front edge of said panel, said last catch being swingable forwardly and spring biased rearwardly, an auxiliary catch swingable into bar intercepting position as said swingable catch is moved forwardly, a limit arm pivoted alongside said turntable and having a hooked end biased toward the periphery of said turntable under the inwardly projecting portion of said guard ring to intercept the downturned hook on said divider bar, a limit switch positioned to be opened by said limit arm as the hook on the divider bar twists with movement of the radially inner end of the bar relative to the hooked end of the limit arm, a motor connected to drive the turntable, and a circuit connecting said motor in series with said limit switch and with said pair of switches connected in parallel with each other and in series with the motor.

2. In combination with a checkstand having a rotatable receiving table, a fixed cash register support panel supported over a sector of said turntable and extending beyond the periphery thereof, said panel being supported along its rear and right edges, said panel having a left edge inclined ahead of a radius of the turntable in the direction of travel of the turntable under the panel, said left edge having an elongated recess therein, the front edge of said panel extending radially with respect to said turntable and having an elongated recess therein, a stand supporting said turntable and extending in radially spaced relation around the front of the turntable, a guard ring secured to said stand and vertically overlying the periphery of the turntable from said front edge of said panel to the left side of the turntable and curving inwardly a limited distance part way toward said left edge of said panel, a fixed discharge counter extending as a continuation of said turntable and closely conformed to the periphery thereof between said left edge and said inwardly curved portion of said guard ring, a switch plate supported across the end of the recess in the left edge of said panel, two pairs of arms swingable about vertical axes on said switch plate, front and rear switch actuators having upright bumper faces and top flanges each swingably supported by a pair of the swinging ends of said arms, springs on said switch plate biasing said actuators to the left of said panel, a pair of switches mounted on said switch plate one behind each of said actuators, said switches being normally closed and opened by movement of said actuators to the right, a cover over said switches and actuators, the inner edge of the recess in the left edge of said panel and the right edge of said cover defining a slot extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a fixed catch depending below the front edge of said panel to intercept the radially inner end of said divider bar, a swingable catch mounted on the front edge of said panel to intercept the radially outer part of said divider bar with the bar exposed under the recess in the front edge of said panel, said last catch being swingable forwardly and spring biased rearwardly, a limit arm pivoted alongside said turntable and having a hooked end biased toward the periphery of said turntable under the inwardly projecting portion of said guard ring to intercept the downturned hook on said divider bar, a limit switch positioned to be opened by said limit arm as the hook on the divider bar twists with movement of the radially inner end of the bar relative to the hooked end of the limit arm, a motor connected to drive the turntable, and a circuit connecting said motor in series with said limit switch and with said pair of switches connected in parallel with each other and in series with the motor.

3. In combination with a checkstand having a rotatable receiving table, a cash register support panel supported over a sector of said turntable, said panel having a left edge inclined ahead of a radius of the turntable in the direction of travel of the turntable under the panel, said left edge having an elongated recess therein, the front edge of said panel having an elongated recess therein, a stand supporting said turntable and extending in radially spaced relation around the front of the turntable, a guard ring secured to said stand and vertically overlying the periphery of the turntable from said front edge of said panel to the left side of the turntable and curving inwardly a limited distance part way toward said left edge of said panel, a fixed discharge counter extending as a continuation of said turntable and closely conformed to the periphery thereof between said left edge and said inwardly curved portion of said guard ring, a switch plate supported across the end of the recess in the left edge of said panel, two pairs of arms swingable about vertical axes on said switch plate, front and rear switch actuators having upright bumper faces and top flanges each swingably supported by a pair of the swinging ends of said arms, springs on said switch plate biasing said actuators to the left, a pair of switches mounted on said switch plate one behind each of said actuators, said switches being normally closed and opened by movement of said actuators to the right, a cover over said switches and actuators, the inner edge of the recess in the left edge of said panel and the right edge of said cover defining a slot extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a fixed catch depending below the front edge of said panel to intercept the radially inner end of said divider bar, a swingable catch mounted on the front edge of said panel to intercept the radially outer part of said divider bar with the bar exposed under the recess in the front edge of said panel, said last catch being swingable forwardly and spring biased rearwardly, a limit arm pivoted alongside said turntable and having a hooked end biased toward the periphery of said turntable under the inwardly projecting portion of said guard ring to intercept the downturned hook on said divider bar, a limit switch positioned to be opened by said limit arm as the hook on the divider bar twists with movement of the radially inner end of the bar relative to the hooked end of the limit arm, a motor connected to drive the turntable, and a circuit connecting said motor in series with said limit switch and with said pair of switches connected in parallel with each other and in series with the motor.

4. In combination with a checkstand having a rotatable receiving table, a cash register support panel supported over a sector of said turntable, said panel having a left edge inclined ahead of a radius of the turntable in the direction of travel of the turntable under the panel, said left edge having an elongated recess therein, the front edge of said panel having an elongated recess therein, a stand supporting said turntable and extending in radially spaced relation around the front of the turntable, a fixed discharge counter extending as a continuation of said turntable and closely conformed to the periphery thereof to the left of said left edge, a switch plate supported along the left edge of said panel, front and rear switch actuators having upright bumper faces and swingably supported on said switch plate, springs on said switch plate biasing said actuators to the left, a pair of switches mounted on said switch plate one behind each of said actuators, said switches being normally closed and opened by movement of said actuators to the right, the left edge of said panel and the right edge of said switch plate defining a slot extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a swingable catch mounted on the front edge of said panel to intercept said divider bar with the bar exposed under the recess in the front edge of said panel, said catch being swingable forwardly and spring biased rearwardly, a limit switch positioned adjacent the intersection of said turntable and the left side of said discharge counter to be opened by the hook on the divider bar, a motor connected to drive the turntable, and a circuit connecting said motor in series with said limit switch and with said pair of switches connected in parallel with each other and in series with the motor.

5. In combination with a checkstand having a rotatable receiving table, a cash register support panel supported over a sector of said turntable and extending beyond the periphery thereof, said panel having a left edge inclined ahead of a radius of the turntable in the direction of travel of the turntable under the panel, said left edge having an elongated recess therein, a fixed discharge counter extending as a continuation of said turntable and closely conformed to the periphery thereof to the left of said left edge, a switch plate supported across the end of the recess in the left edge of said panel, two pairs of arms swingable about vertical axes on said switch plate, front and rear switch actuators having upright bumper faces and top flanges each swingably supported by a pair of the swinging ends of said arms, springs on said switch plate biasing said actuators to the left of said panel, a pair of switches mounted on said switch plate one behind each of said actuators, said switches being normally closed and opened by movement of said actuators to the right, a cover over said switches and actuators, the inner edge of the recess in the left edge of said panel and the right edge of said cover defining a slot extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a fixed catch depending below the front edge of said panel to intercept the radially inner end of said divider bar, a swingable catch mounted on the front edge of said panel to intercept the radially outer part of said divider bar with the bar exposed under the recess in the front edge of said panel, said last catch being swingable forwardly and spring biased rearwardly, a limit arm pivoted alongside said turntable and having a hooked end biased toward the periphery of said turntable under the inwardly projecting portion of said guard ring to intercept the downturned hook on said divider bar, a limit switch positioned to be opened by said limit arm as the hook on the divider bar twists with movement of the radially inner end of the bar relative to the hooked end of the limit arm, a motor connected to drive the turntable, and a circuit connecting said motor in series with said limit switch and with said pair of switches connected in parallel with each other and in series with the motor.

6. In combination with a checkstand having a rotatable receiving table, a cash register support panel supported over a sector of said turntable and extending beyond the periphery thereof, said panel having a left edge inclined ahead of a radius of the turntable in the direction of travel of the turntable under the panel, a fixed discharge counter extending as a continuation of said turntable and closely conformed to the periphery thereof to the left of said left edge, a switch plate supported along the left edge of said panel, front and rear switch actuators having upright bumper faces and each swingably supported on said switch plate, springs on said switch plate biasing said actuators to the left of said panel, a pair of switches mounted on said switch plate one behind each of said actuators, said switches being normally closed and opened by movement of said actuators to the right, a motor connected to drive the turntable, and a circuit connecting said motor in series with said pair of switches connected in parallel with each other and in series with the motor.

7. In combination with a checkstand having a rotatable receiving table, a cash register support panel supported over a sector of said turntable, said panel having a left edge inclined ahead of a radius of the turntable in the direction of travel of the turntable under the panel, a fixed discharge counter extending as a continuation of said turntable and closely conformed to the periphery thereof to the left of said left edge, front and rear switch actuators having upright bumper faces and each movably supported in aligned relation along said left edge of said panel, springs biasing said actuators to the left of said panel, a pair of switches mounted one behind each of said actuators, said switches being normally closed and opened by movement of said actuators to the right, said panel defining a slot located to the right of said switch actuators and extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a swingable catch mounted on the front edge of said panel to intercept said divider bar, said catch being swingable forwardly and spring biased rearwardly, means for swinging said catch upwardly to bar disengaging position, a limit arm pivoted alongside said turntable and having a hooked end biased toward the periphery of said turntable adjacent the intersection of the turntable with the left side of the discharge counter to intercept the downturned hook on said divider bar, a limit switch positioned to be opened by said limit arm as the hook on the divider bar moves the hooked end of the limit arm, a motor connected to drive the turntable, and a circuit connecting said motor in series with said limit switch and with said pair of switches connected in parallel with each other and in series with the motor.

8. In combination with a checkstand having a rotatable receiving table, a cash register support panel supported over a sector of said turntable, said panel having a left edge inclined ahead of a radius of the turntable in the direction of travel of the turntable under the panel, a fixed discharge counter extending as a continuation of said turntable and closely conformed to the periphery thereof to the left of said left edge, front and rear switch actuators having upright bumper faces and each movably supported in aligned relation along said left edge of said panel, springs biasing said actuators to the left of said panel, a pair of switches mounted one behind each of said actuators, said switches being normally closed and opened by movement of said actuators to the right, a motor connected to drive the turntable, and a circuit connecting said motor with said pair of switches connected in parallel with each other and in series with the motor.

9. In combination with a checkstand having a rotatable receiving table, a cash register support panel supported over a sector of said turntable, said panel having a left edge inclined ahead of a radius of the turntable in the direction of travel of the turntable under the panel, a rail extending in radially spaced relation around the front of the turntable, a guard ring secured to said rail and vertically overlying the periphery of the turntable from said front edge of said panel to the left side of the turntable and curving inwardly a limited distance part way toward said left edge of said panel, a fixed discharge counter extending as a continuation of said turntable and closely conformed to the periphery thereof between said left edge and said inwardly curved portion of said guard ring, a switch actuator movably supported along the left edge of said panel to be engaged by articles rotated thereagainst by said turntable, a spring biasing said actuator to the left, a switch mounted behind said actuator, said switch being normally closed and opened by movement of said actuator to the right, the left portion of said panel defining a slot to the right of said switch actuator and extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a fixed catch depending below the front edge of said panel to intercept the radially inner end of said divider bar, a swingable catch mounted on the front edge of said panel to intercept the radially outer part of said divider bar, said last catch being swingable forwardly and spring biased rearwardly, an auxiliary catch swingable into bar intercepting position as said swingable catch is moved forwardly, a limit arm pivoted alongside said turntable and having a hooked end biased toward the periphery of said turntable under the inwardly projecting portion of said guard ring to intercept the downturned hook on said divider bar, a limit switch positioned to be opened by said limit arm as the hook on the divider bar twists with movement of the radially inner end of the bar relative to the hooked end of the limit arm, a motor connected to drive the turntable, and a circuit connecting said motor in series with said switches.

10. In combination with a checkstand having a rotatable receiving table, a cash register support panel supported over a sector of said turntable, said panel having a left edge extending across the turntable transversely to the direction of travel of the turntable under the panel, a rail extending in radially spaced relation around the front of the turntable, a guard ring secured to said rail and vertically overlying the periphery of the turntable from said front edge of said panel to the left side of the turntable and curving inwardly a limited distance part way toward said left edge of said panel, a fixed discharge counter extending as a continuation of said turntable and closely conformed to the periphery thereof between said left edge and said inwardly curved portion of said guard ring, a switch actuator movably supported along the left edge of said panel to be engaged by articles rotated thereagainst by said turntable, a spring biasing said actuator to the left, a switch mounted behind said actuator, said switch being normally closed and opened by movement of said actuator to the right, the left portion of said panel defining a slot to the right of said switch actuator and extending across the periphery of said turntable, an elongated divider bar adapted to be received in said slot and having a downturned hook on its outer end, a stop on the underside of said panel at the front of said slot engageable with the front of said bar to locate said hook over the edge of said turntable, a swingable catch mounted on the front edge of said panel to intercept said divider bar, said last catch being swingable forwardly and spring biased rearwardly, a limit switch positioned to be opened by said hook on the divider bar as the hooked end reaches the inwardly curved portion of the guard ring, a motor connected to drive the turntable, and a circuit connecting said motor in series with said switches.

11. In combination with a checkstand having a rotatable receiving table, a cash register support panel supported over a sector of said turntable, said panel having a left edge extending transversely of the direction of travel of the turntable under the panel, said left edge having an elongated recess therein, a fixed discharge counter extending as a continuation of said turntable and closely conformed to the periphery thereof to the left of said left edge, normally closed electric switch means arranged to be opened by movement of articles by said turntable to adjacent the left edge of said panel, the recess in the left side of said panel extending across the periphery of said turntable, an elongated divider bar adapted to be received in said recess and having a downturned hook on its outer end, a stop on the underside of said panel at the front of said recess engageable with the front of said bar to locate said hook over the edge of said turntable, a swingable catch mounted on the front edge of said panel to intercept said divider bar, said last catch being swingable forwardly and spring biased rearwardly, a limit switch positioned alongside said turntable adjacent the left side of said discharge counter and arranged to be opened by the hook on the divider bar as the bar twists with movement of the radially inner end of the bar relative to the hooked end of the bar, a motor connected to drive the turntable, and a circuit connecting said motor in series with said limit switch and said switch means.

12. In combination with a checkstand having a rotatable receiving table, a cash register support panel supported over a sector of said turntable, said panel having a left edge extending transversely of the direction of travel of the turntable under the panel, said left edge having an elongated recess therein, a fixed discharge counter extending as a continuation of said turntable and closely conformed to the periphery thereof to the left of said left edge, normally closed electric switch means arranged to be opened by movement of articles by said turntable to adjacent the left edge of said panel, the recess in the left side of said panel extending across the periphery of said turntable, an elongated divider bar adapted to be received in said recess and having a downturned hook on its outer end, a swingable catch mounted on the front edge of said panel to intercept said divider bar, said last catch being swingable forwardly and spring biased rearwardly, a limit switch positioned alongside said turntable adjacent the left side of said discharge counter and arranged to be opened by the hook on the divider bar a motor connected to drive the turntable, and a circuit connecting said motor in series with said limit switch and said switch means.

13. A checkstand comprising a cash register support adapted to support a cash register in front of a checking position, a discharge counter positioned to the left of said checking position, a rotatable article receiving conveyor positioned at the front of said discharge counter and extending underneath said support, the front end of said discharge counter being positioned closely adjacent the edge of said conveyor, a motor connected to drive said conveyor to advance articles transversely to the side of said support, a pair of alined switch actuating bars yieldably and vertically adjustably disposed over said conveyor and at the side of said support, said bars being inclined rearwardly and to the right relative to said support, a pair of switches arranged to be opened one by each of said actuators under the influence of articles advanced against the actuators by said conveyor, the left side of said support defining an opening to the right of said switch actuators and extending across the periphery of said conveyor, an elongated divider bar adapted to lie in a generally radial position on said conveyor and having a downturned hooked end engageable over the periphery of the conveyor, said opening in said support being adapted to pass said bar into supported engagement with said conveyor under said support, a limit switch positioned at the periphery of said conveyor adjacent the junction of the conveyor with the discharge counter and adapted to be opened by advance of the downturned end of said bar to said switch, and an energizing circuit for said motor including said limit switch in series and said pair of switches in series parallel relation to the motor.

14. A checkstand comprising a cash register support adapted to support a cash register in front of a checking position, a discharge counter positioned to the left of said checking position, a rotatable article receiving conveyor positioned at the front of said discharge counter and extending underneath said support, the front end of said discharge counter being positioned closely adjacent the edge of said conveyor, a motor connected to drive said conveyor to advance articles transversely to the side of said support, a pair of alined switch actuating bars yieldably disposed over said conveyor and at the side of said support, said bars being inclined rearwardly and to the right relative to said support, a pair of switches arranged to be opened one by each of said actuators under the influence of articles advanced against the actuators by said conveyor, and an energizing circuit for said motor including said pair of switches in series parallel relation to the motor.

15. A checkstand comprising a cash register support adapted to support a cash register in front of a checking position, a discharge counter positioned to the left of said checking position, an article receiving conveyor positioned at the front of said discharge counter, the front end of said discharge counter being positioned closely adjacent the edge of said conveyor, a motor connected to drive said conveyor to advance articles transversely to the side of said support, a pair of alined switch actuating bars yieldably disposed over said conveyor and at the side of said support, said bars being inclined rearwardly and to the right relative to the direction of movement of said conveyor at the side of said support, a pair of switches arranged to be opened one by each of said actuators under the influence of articles advanced against the actuators by said conveyor, and an energizing circuit for said motor including said pair of switches in series parallel relation to the motor.

16. A checkstand comprising a cash register support adapted to support a cash register in front of a checking position, a discharge counter positioned to the left of said checking position, a rotatable article receiving conveyor positioned at the front of said discharge counter and extending underneath and to the front of said support, the front end of said discharge counter being positioned closely adjacent the edge of said conveyor, a motor connected to drive said conveyor to advance articles transversely to the side of said support, a pair of alined switch actuating bars yieldably disposed over said conveyor and at the side of said support, said bars being inclined rearwardly and to the right relative to said support, a pair of switches arranged to be opened one by each of said actuators under the influence of articles advanced against the actuators by said conveyor, the left side of said support defining an opening to the right of said switch actuators and opening to the periphery of said conveyor, an elongated divider bar adapted to lie in a generally radial position on said conveyor and having a downturned hooked end engageable over the periphery of the conveyor, said opening in said support being adapted to pass said bar into supported engagement with said conveyor below the level of said support, a releasable catch at the front edge of said support adapted to intercept and hold divider bars advanced there-against by said conveyor, a limit switch positioned at the periphery of said conveyor adjacent the junction of the conveyor with the discharge counter and adapted to be opened by advance of the downturned end of said bar to said switch, and an energizing circuit for said motor including said limit switch in series and said pair of switches in series parallel relation to the motor.

17. A checkstand comprising a cash register support adapted to support a cash register in front of a checking position, a discharge counter positioned to the left of said checking position, a rotatable article receiving conveyor positioned at the front of said discharge counter and extending underneath and to the front of said support, the front end of said discharge counter being positioned closely adjacent the edge of said conveyor, a motor connected to drive said conveyor to advance articles transversely to the side of said support, a pair of alined switch actuating bars yieldably disposed over said conveyor and at the side of said support, said bars being inclined rearwardly and to the right relative to said support, a pair of switches arranged to be opened one by each of said actuators under the influence of articles advanced against the actuators by said conveyor, said support defining an opening to the right of said switch actuators and opening to the periphery of said conveyor, an elongated divider bar adapted to lie in a generally radial position on said conveyor and having a downturned hooked end engageable over the periphery of the conveyor, said opening in said support being adapted to pass said bar into supported engagement with said conveyor below the level of said support, a limit switch positioned at the periphery of said conveyor adjacent the junction of the conveyor with the discharge counter and adapted to be opened by advance of the downturned end of said bar to said switch, and an energizing circuit for said motor including said limit switch in series and said pair of switches in series parallel relation to the motor.

18. A checkstand comprising a cash register support adapted to support a cash register in front of a checking position, a discharge counter positioned to the left of said checking position, a rotatable article receiving conveyor positioned at the front of said discharge counter and extending underneath and to the front of said support, the front end of said discharge counter being positioned closely adjacent the edge of said conveyor, a motor connected to drive said conveyor to advance articles transversely to the side of said support, said support defining an opening to the periphery of said conveyor, an elongated divider bar adapted to lie in a generally radial position on said conveyor and having a downturned hooked end engageable over the periphery of the conveyor, said opening in said support being adapted to pass said bar into supported engagement with said conveyor below the level of said support, a releasable catch at the front edge of said support adapted to intercept and hold divider bars advanced thereagainst by said conveyor, a limit switch positioned at the periphery of said conveyor adjacent the junction of the conveyor with the discharge counter and adapted to be opened by advance of the downturned end of said bar to said switch, and an energizing circuit for said motor including said limit switch in series relation to the motor.

19. A checkstand comprising a cash register support adapted to support a cash register in front of a checking position, a discharge counter positioned to the left of said checking position, a rotatable article receiving conveyor positioned at the front of said discharge counter and extending underneath and to the front of said support, the front end of said discharge counter being positioned closely adjacent the edge of said conveyor, a motor connected to drive said conveyor to advance articles transversely to the side of said support, said support defining an opening to the periphery of said conveyor, an elongated divider bar adapted to lie in a generally radial position on said conveyor, said opening in said support being adapted to pass said bar into supported engagement with said conveyor below the level of said support, a releasable catch at the front edge of said support adapted to intercept and hold divider bars advanced thereagainst by said conveyor, a limit switch positioned at the periphery of said conveyor adjacent the junction of the conveyor with the discharge counter and adapted to be opened by advance of said bar to said switch, and an energizing circuit for said motor including said limit switch in series relation to the motor.

References Cited in the file of this patent

UNITED STATES PATENTS

| | | |
|---|---|---|
| 1,763,812 | Olson | June 17, 1930 |
| 1,901,928 | Olson | Mar. 21, 1933 |
| 2,599,909 | George | June 10, 1952 |
| 2,631,689 | Rubaloff | Mar. 17, 1953 |
| 2,776,730 | Crawford | Jan. 8, 1957 |